United States Patent
Wiesman et al.

(10) Patent No.: US 10,757,922 B2
(45) Date of Patent: Sep. 1, 2020

(54) SYSTEM AND METHOD FOR TREATING FISH

(71) Applicant: Foster-Miller, Inc., Waltham, MA (US)

(72) Inventors: Richard Wiesman, Wayland, MA (US); Robert Steingart, Wellesley, MA (US); Matthew Haggerty, Dedham, MA (US); Timothy Przybylowicz, Boston, MA (US); Kare Finstadsveen, South Weymouth, MA (US)

(73) Assignee: Foster-Miller, Inc., Waltham, MA (US)

( * ) Notice: Subject to any disclaimer, the term of this patent is extended or adjusted under 35 U.S.C. 154(b) by 211 days.

(21) Appl. No.: 15/914,374

(22) Filed: Mar. 7, 2018

(65) Prior Publication Data

US 2018/0255749 A1    Sep. 13, 2018

Related U.S. Application Data

(60) Provisional application No. 62/468,692, filed on Mar. 8, 2017.

(51) Int. Cl.
*A01K 61/13* (2017.01)

(52) U.S. Cl.
CPC .............. *A01K 61/13* (2017.01); *Y02A 40/814* (2018.01)

(58) Field of Classification Search
CPC ......... A01K 61/00; A01K 61/13; A01K 61/10
See application file for complete search history.

(56) References Cited

U.S. PATENT DOCUMENTS

| | | | |
|---|---|---|---|
| 1,461,350 A | 7/1923 | Friedrichs | |
| 4,091,506 A * | 5/1978 | Soerensen | A22C 25/147 452/116 |
| 4,765,030 A * | 8/1988 | Dubowik | A22C 25/17 452/126 |
| 5,026,318 A * | 6/1991 | Jahnke | A22C 25/147 452/116 |
| 5,628,680 A | 5/1997 | Hjorth | |

(Continued)

FOREIGN PATENT DOCUMENTS

| CA | 2858878 A1 | 2/2015 |
|---|---|---|
| CN | 102742542 B | 3/2013 |

(Continued)

OTHER PUBLICATIONS

Written Opinion of the International Searching Authority for PCT Application No. PCT/US2018/021337 dated May 17, 2018, four (4) pages.

(Continued)

*Primary Examiner* — Magdalena Topolski
*Assistant Examiner* — Morgan T Barlow
(74) *Attorney, Agent, or Firm* — Iandiorio Teska & Coleman, LLP

(57) ABSTRACT

A system for removing parasites from fish includes a downwardly angled enclosed conduit through which individual fish freely pass, and two or more spaced sets of arms extending inward from the conduit. There is a spray nozzle for each arm connected to a fluid source for dislodging parasites from the fish. The arms are adjustable relative to the enclosed conduit depending on the size of the fish in the conduit for closely spacing the spray nozzles with respect to the fish without stressing or harming the fish.

11 Claims, 14 Drawing Sheets

(56) References Cited

U.S. PATENT DOCUMENTS

| | | | | |
|---|---|---|---|---|
| 8,033,897 B2 * | 10/2011 | Shimachi | ............ | A22C 25/147 |
| | | | | 452/149 |
| 8,512,106 B2 * | 8/2013 | Ryan | .................... | A22C 25/147 |
| | | | | 452/121 |
| 9,301,498 B2 | 4/2016 | Ulrikse | | |
| 2004/0244712 A1 * | 12/2004 | Massey | .................. | A01K 61/90 |
| | | | | 119/216 |
| 2005/0158430 A1 | 7/2005 | Wiesman et al. | | |
| 2013/0050465 A1 | 2/2013 | Beck | | |
| 2014/0174371 A1 | 6/2014 | Ulriksen | | |
| 2015/0000606 A1 | 1/2015 | Angell et al. | | |
| 2016/0330943 A1 * | 11/2016 | Egge | ..................... | A01K 79/00 |
| 2017/0172114 A1 * | 6/2017 | Halse | .................... | A01K 61/00 |
| 2018/0153142 A1 * | 6/2018 | Hansen | ................ | A01K 63/045 |
| 2019/0037865 A1 * | 2/2019 | Pettersen | ............... | A01K 61/95 |
| 2019/0269107 A1 * | 9/2019 | Lvarez Gatica | ....... | A01K 61/00 |

FOREIGN PATENT DOCUMENTS

| | | |
|---|---|---|
| EP | 2 837 284 A1 | 2/2015 |
| EP | 3 114 926 A1 | 1/2017 |
| GB | 2271046 B | 5/1996 |
| KR | 101507052 B1 | 3/2015 |
| WO | WO 98/24304 A1 | 6/1998 |
| WO | WO 2010/087722 A1 | 8/2010 |
| WO | WO 2011/099865 A1 | 8/2011 |
| WO | WO 2011/135384 A1 | 11/2011 |
| WO | WO 2013/001317 A2 | 1/2013 |
| WO | 2014123427 A1 | 8/2014 |
| WO | WO 2014/129908 A1 | 8/2014 |
| WO | WO 2014/184766 A1 | 11/2014 |
| WO | WO 2015/043603 A1 | 4/2015 |
| WO | WO 2015/143549 A1 | 10/2015 |
| WO | 2016133802 A1 | 8/2016 |
| WO | 2016168888 A1 | 10/2016 |
| WO | WO 2016/189146 A1 | 12/2016 |

OTHER PUBLICATIONS

Written Opinion of the International Searching Authority for PCT Application No. PCT/US18/27948 dated Jul. 5, 2018, six (6) pages.

Canadian Science Advisory Secretariat, Fisheries and Oceans Canada, Science Advisory Report 2008/001, National Capital Region, "Assessing Potential Technologies for Closed-Containment Saltwater Salmon Aquaculture", Mar. 2008, seventeen (17) pages.

Steven Summerfelt & Brian Vinci, "Ozonation and UV Disinfection", Freshwater Institute, Shepherdstown, WV, 9$^{th}$ Annual Recirculating Aquaculture Systems Short Course, http://www.ozomax.com/pdf/ozonation-uv-disinfection.pdf, Dec. 22, 2015, twenty-three (23) pages.

Primozone®, "Research shows that water treatment with ozone increases productivity at RAS aquaculture systems", http://www.primozone.com/aquaculture, 2016, two (2) pages.

* cited by examiner

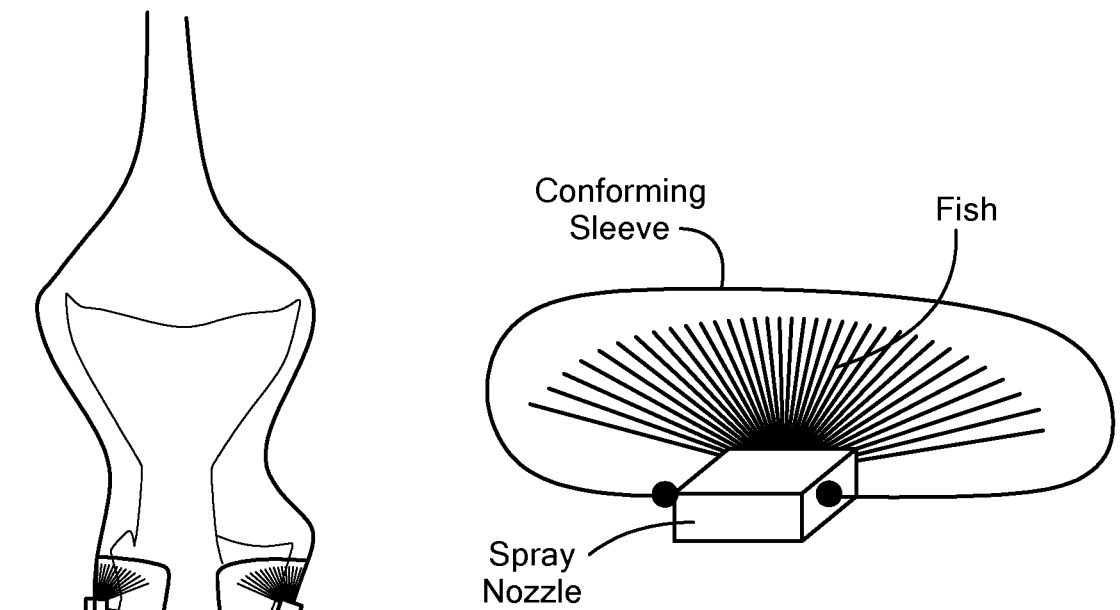
FIG. 13
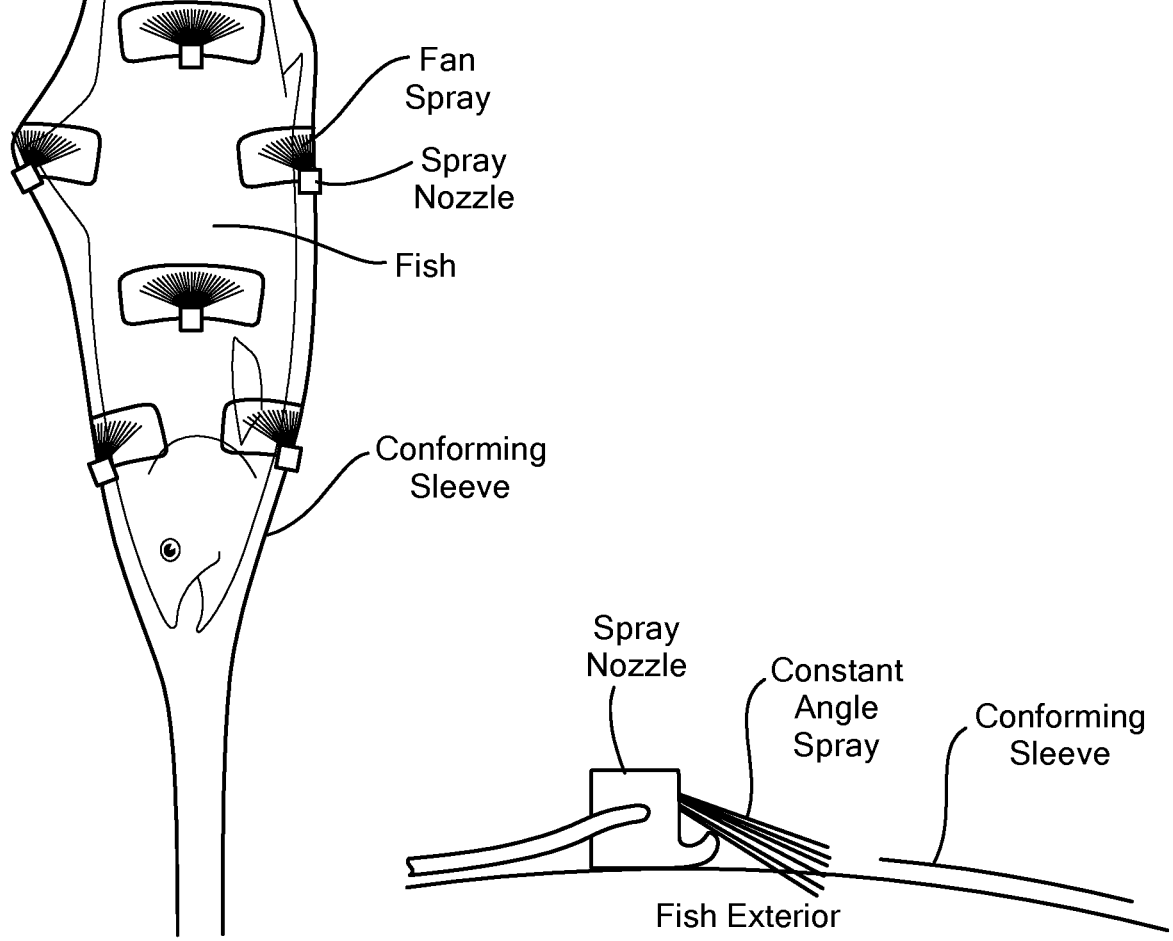
FIG. 12
FIG. 14

- Planal arrangement of fish
- Singulation & strict orientation not req'd
- No relative motion of belt on fish
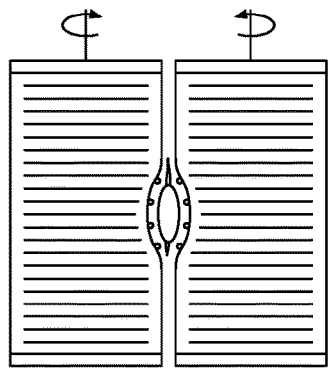
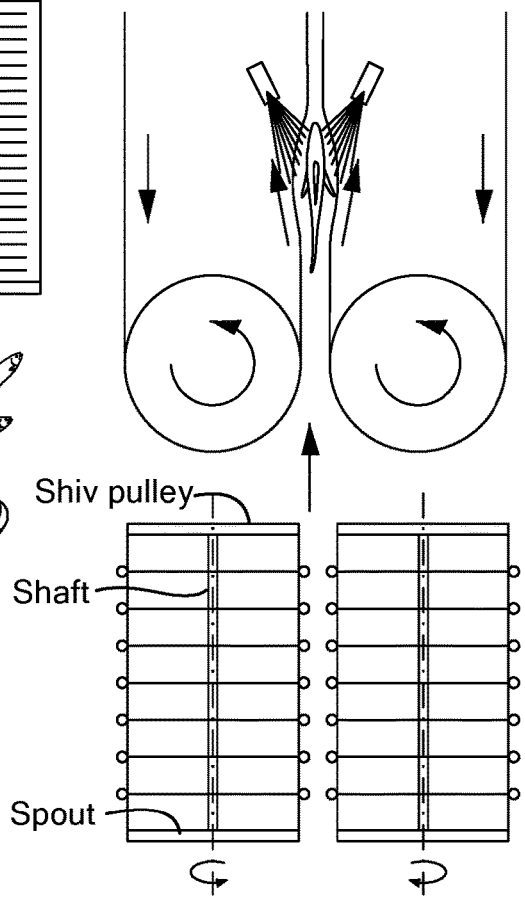
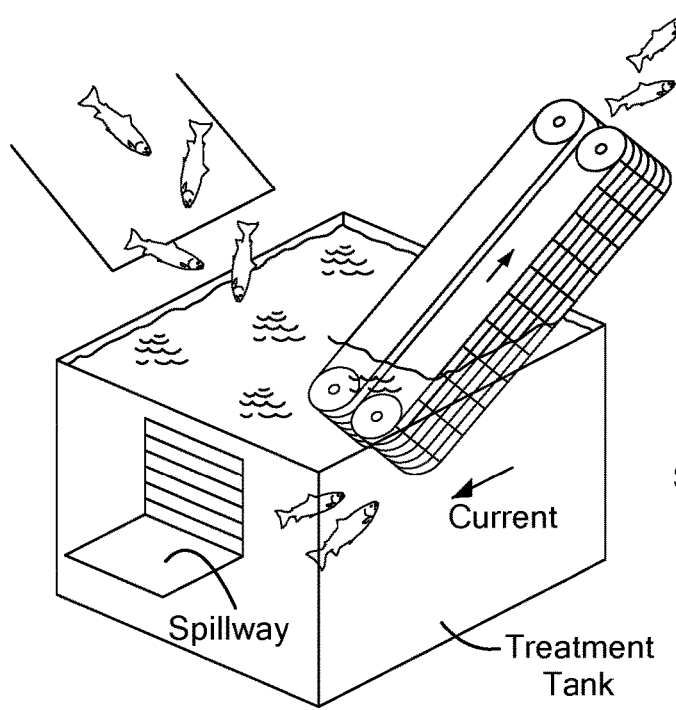
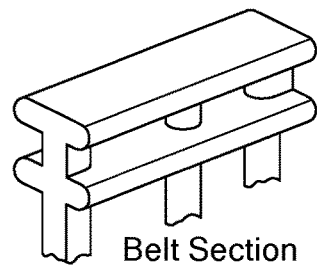
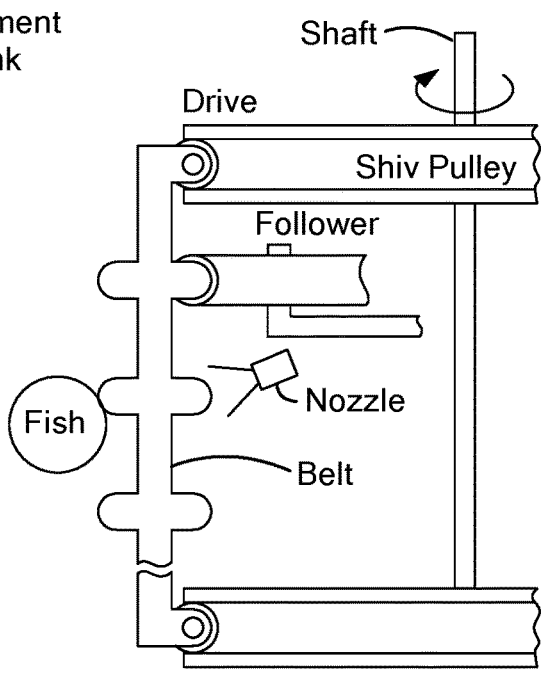
FIG. 16

SYSTEM AND METHOD FOR TREATING FISH

RELATED APPLICATIONS

This application claims benefit of and priority to U.S. Provisional Application Ser. No. 62/468,692 filed Mar. 8, 2017, under 35 U.S.C. §§ 119, 120, 363, 365, and 37 C.F.R. § 1.55 and § 1.78, and is incorporated herein by this reference.

FIELD OF THE INVENTION

This subject invention relates to methods and systems for treating fish (e.g., salmon) to rid them of parasites. (e.g., sea lice).

BACKGROUND OF THE INVENTION

Fish farming is a large business but the damage caused by parasites cost fish farmers huge sums of money each year. Chemical treatments (see, e.g., U.S. 2013/0095126, incorporated herein by reference) may be ineffective and/or costly, may damage or kill the fish, and/or may pollute the water and/or damage other organisms. Certain pesticides, drugs, vaccines, and the like may result in genetically resistant sea lice.

Warm water and/or fresh water treatments may be ineffective, expensive, and often require long treatment times. Moreover, if the sea lice become resistant to fresh water, then wild saltwater fish migrating in fresh water can be put at risk.

Some mechanical treatments have been proposed. For example, WO 98/24314, incorporated by reference herein, proposes using water jets to remove sea lice from salmon. But, the water jets are fixed in place. Since the salmon are not stationary, and are not a constant size, large fish may be damaged by the water jets and, for smaller fish, the jet pressure may not be great enough to effectively remove the sea lice. Moreover, the water from the spray nozzles has to travel through water before reaching the surface of the fish body lowering the effectiveness of the water jet. And, the water jets are in a single fixed configuration with fixed angles.

BRIEF SUMMARY OF THE INVENTION

In one preferred method and system, fish (e.g., salmon) are treated in two zones in a cost effective and expedient manner to more effectively remove parasites (e.g., sea lice) from the fish. The throughput of the preferred system results in many fish being treated in a short amount of time. Parts of the process may include a batch treatment or the system may be configured for a continuous process. In the first treatment zone (which may be optional), the fish are subject to a treatment that kills and/or weakens the parasites. This may include chemical treatments, for example, some sort of osmotic de-regulation that may be used in the first zone for killing, paralyzing, and/or weakening the parasites. Optionally, or in addition, the pH level of the sea water in the first treatment zone may be adjusted up or down, or both, to speed and increase the effectiveness of the treatment. Other substances such as hydrogen peroxide may be used. Other treatments may include varying temperature, salinity, dissolved gases, light exposure, or any other methods including sound, pressure, ultrasound, electrostatic, electromagnetic, laser, and/or plasma exposure that may kill or weaken the parasites. The parasites may be killed or weakened by the treatment(s) in the first treatment zone. Some parasites may be weakened or temporarily paralyzed but still attached to the fish. Other parasites may be released from the fish in the first treatment zone.

In the second treatment zone, physical treatments, (e.g., fish agitation, water jets sprayed through air at the fish) remove parasites from the fish. The removed parasites and their eggs (if any) may be collected by the system, killed (if still alive) and may be used as food (e.g., food for the fish that were previously treated), or for other purposes. The dead parasites may also be collected and simply discharged back into the ocean. This also applies to the parasite's egg-strings and loose eggs. Preferably, the fish are not stressed or harmed, the environment is not harmed, and the method and system are cost effective. 90-100% of the parasites may be removed from the fish using the systems described herein.

The subject invention, however, in other embodiments, need not achieve all these objectives and the claims hereof should not be limited to structures or methods capable of achieving all of these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIGS. 12-14 are schematic views of spray nozzles attached to a radially expandable chute;

FIG. 16 includes views of another fish treatment system.

DETAILED DESCRIPTION OF THE INVENTION

Figure 1A:
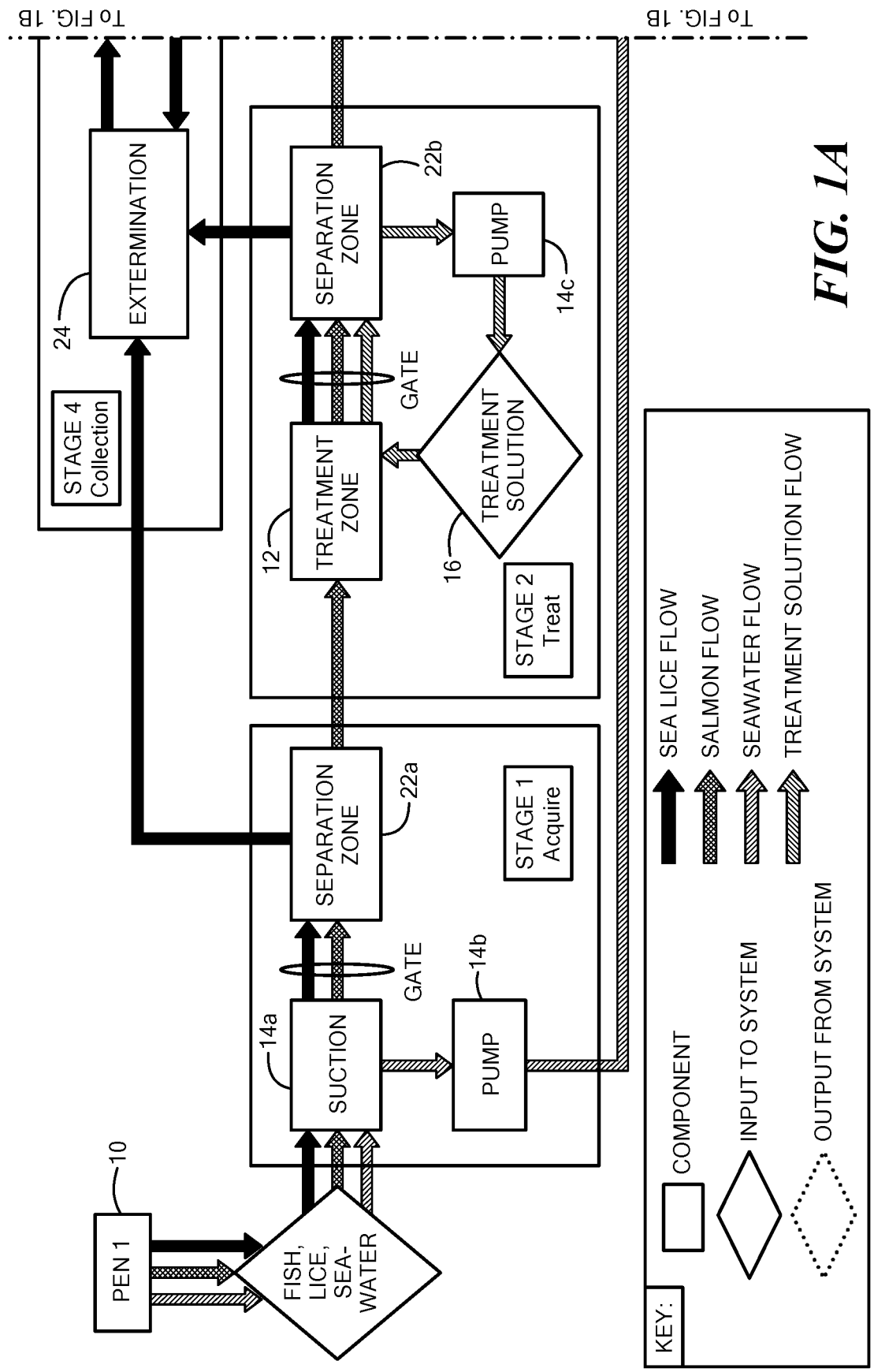
FIGS. 1A and 1B is a block diagram showing an example of the primary components associated with a system for and method of treating fish where the first treatment zone is a batch subsystem.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1B:
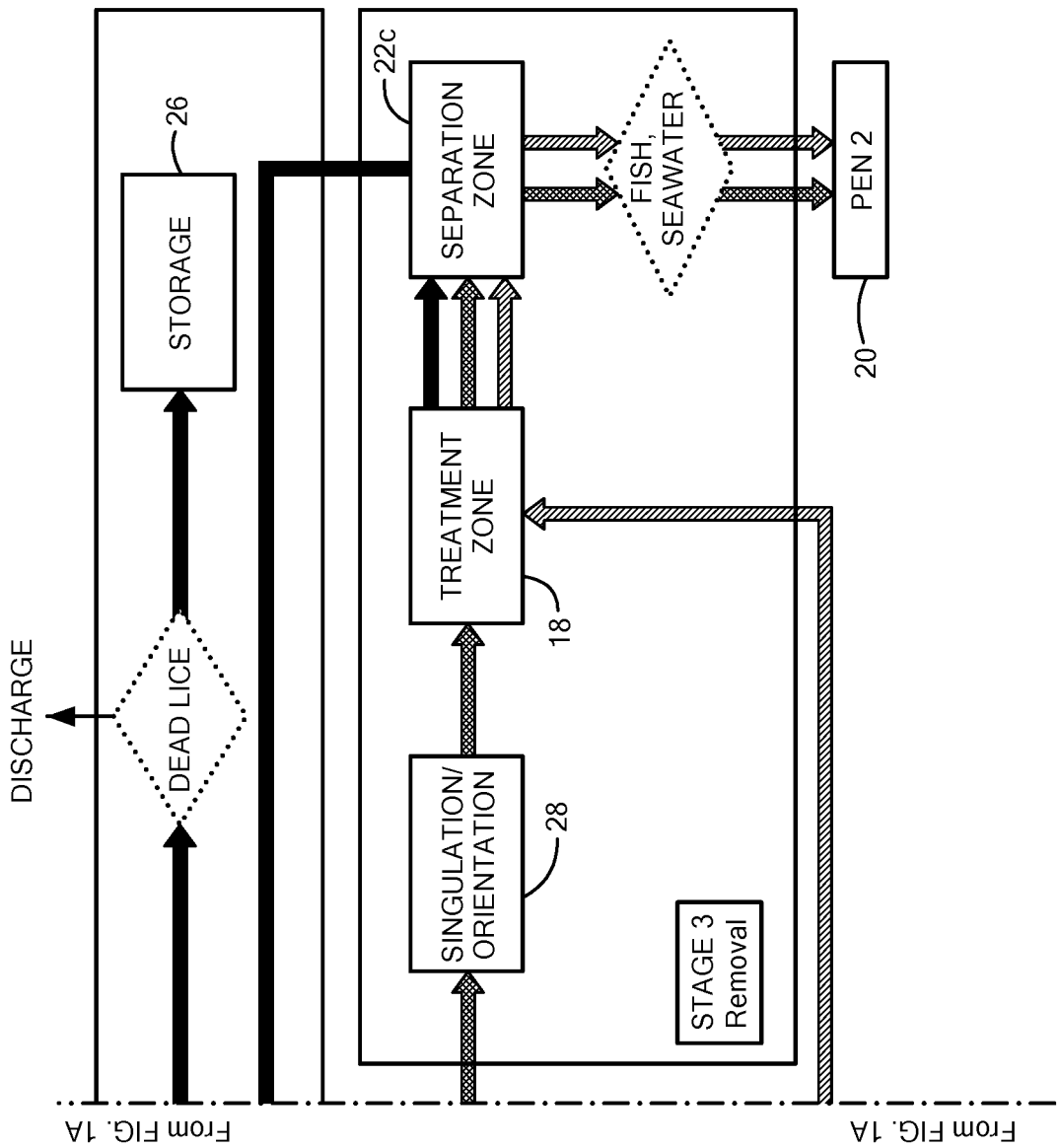

FIG. 1 shows an example of a system for removing parasites from fish kept in pen 10 (which may be in the ocean). The system may, for example, be located on a vessel such as a barge or well boat. See US 2016/0244130, incorporated by reference herein.

Fish in pen 10 are transported in sea water to the first treatment zone 12. Various mechanisms can be used to transport fish in sea water, which may include: vacuum pumps, conveyors, or Archimedes' screws. See WO 2014/129908 and also WO 2014/184776 both incorporated by reference herein.

In first treatment zone 12, the fish may be treated with a substance (e.g., a solution) introduced into the treatment zone 12 as shown at 16. An exemplary dwell time may be 5-25 minutes. Preferred is an osmotic deregulator which weakens and/or kills sea lice on the fish. Examples include Brine ($CaCO_3$), iodine, potassium iodide, and lactic acid (e.g. four parts per thousand). Other possible treatments include known chemicals and compounds. Adjusting other variables, such as dissolved gases, salinity, and temperature, in conjunction with an osmotic deregulator or other treatment substance may decrease treatment time and improve effectiveness. The pH level of the water in treatment zone 12 may be adjusted to decrease treatment time and improve effectiveness. See, U.S. Pat. No. 8,759,073 incorporated by reference herein. For example, sodium hydroxide may be used to raise the pH of the sea water while maintaining a safe level of pH and exposure time for the fish to approximately 10.0. Hydrochloric acid may be used to lower the pH of the sea water to approximately 4.0 while maintaining a safe level of pH and exposure time for the fish. Again, the dwell time, in one example, may be between two and thirty (e.g., five) minutes. If needed, the water output from treatment zone 12 may be treated again to bring it back to a nominal pH level (e.g., 8.3). Ozone may also be used in treatment zone 12. See, for example, WO 2014/129908 and WO 2013/066191 (both incorporated herein by this reference). The water temperature in the first treatment zone may be controlled to improve the effectiveness of the treatment and to improve the general health of the fish during treatment.

In treatment zone 12, some or all of the parasites will be killed or at least weakened. One or more of the above described treatments as well as others may be used in treatment zone 12. The parasites may be weakened to the point they are not as strongly attached to the fish. Some parasites may be removed from the fish.

The fish are then preferably transferred to second treatment zone 18 where a physical treatment is preferred to remove parasites from the fish. Treated fish with reduced parasites are then returned to a pen. The fish may optionally be sedated for the treatment in the first and/or second zone.

The system may further include separation zones 22a, 22b, and 22c where lice (and/or their eggs) in the sea water and/or another solution present in the system are collected and exterminated at station 24. UV radiation may be used. Other extermination means may be used. The dead sea lice may be transported to storage vessel 26 for use as fish food, for example. The separation zones may include, for example, grates, filters, and the like through which water and any sea lice (and/or their eggs) pass but fish are directed to a different path. These separation zones ensure the parasites do not reattach themselves to the fish and ensure that any eggs do not mature into parasites. There may be a singulation and/or orientation mechanism 28 upstream of treatment zone 18 so only a single fish at a time, oriented head first, enters treatment zone 18. Singulation and/or orientation may also be performed manually with a mechanism to present the fish to human operators for this purpose. Sea water may be sprayed on the fish in treatment zone 18 via pump 14b. Pump 14c may be used to pump sea water at separation zone 22b to mix with the treatment solution at 16 which is pumped into treatment zone 12. Any removed sea lice and egg strings in the system due to spraying of the fish, scraping of the fish, and/or due to movement of the fish, or treatment of any kind of the fish, may be removed from the system in separation zone 22c where water and removed sea lice are directed to extermination zone 24. In some examples, the fish are not swimming in the sea water in second treatment zone 18.

Figure 2:
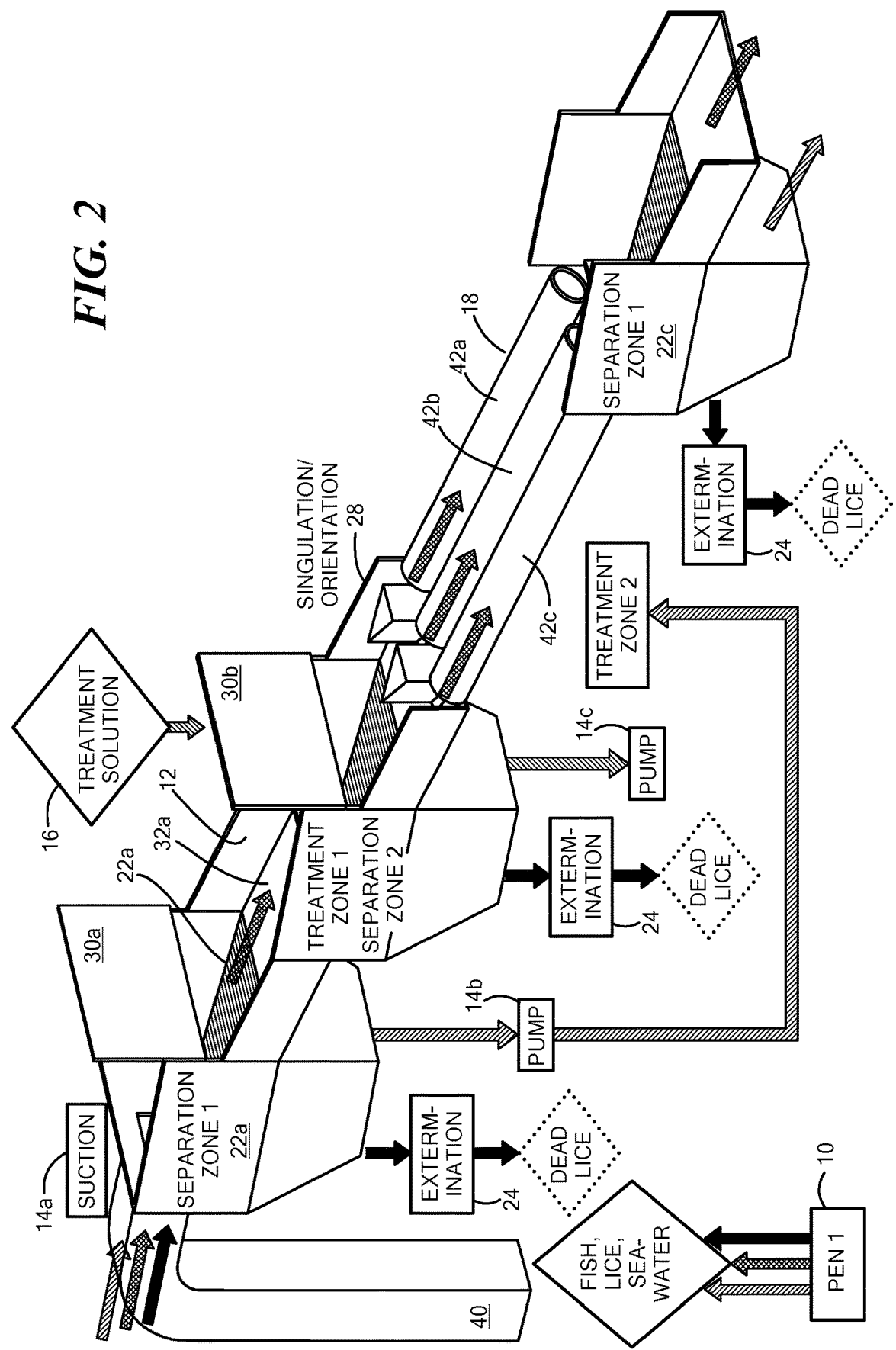
FIG. 2 is a schematic view showing an example of a treatment system in accordance with the block diagram of FIGS. 1A and 1B.

FIG. 2 shows an example where a series of gates 30a and 30b are used. Fish are brought into optional separation zone 22a via conduit 40 with gate 30a open and gate 30b closed until a predetermined amount of fish are present in chamber 32a of treatment zone 12 in sea water. Weighing or some other process may be used to determine when a sufficient number of fish are present in chamber 32a.

A treatment solution or compound such as shown at 16 is then pumped into chamber 32a to treat the fish for a predetermined dwell time after which gate 30b is opened and, the fish may be singulated and oriented at station 28 to travel within one or more conduits, 42a, 42b, 42c of treatment zone 18. The fish, after mechanical treatment in treatment zone 18 then pass through separation zone 22c and back into a pen.

Figure 3:
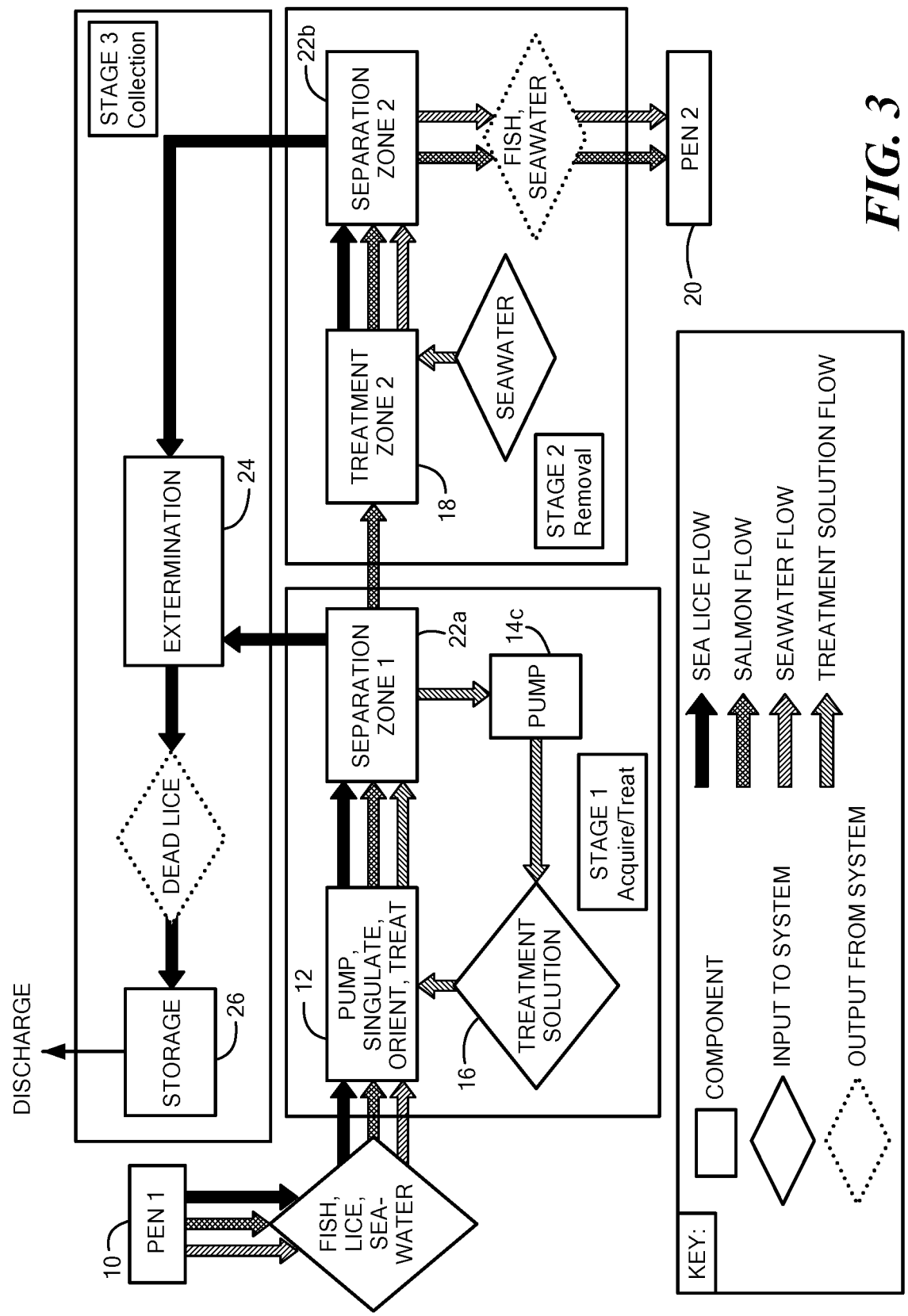
FIG. 3 is block diagram showing the primary components associated with an example of a system for and method of treating fish where the first treatment zone is continuous.
Figure 4:
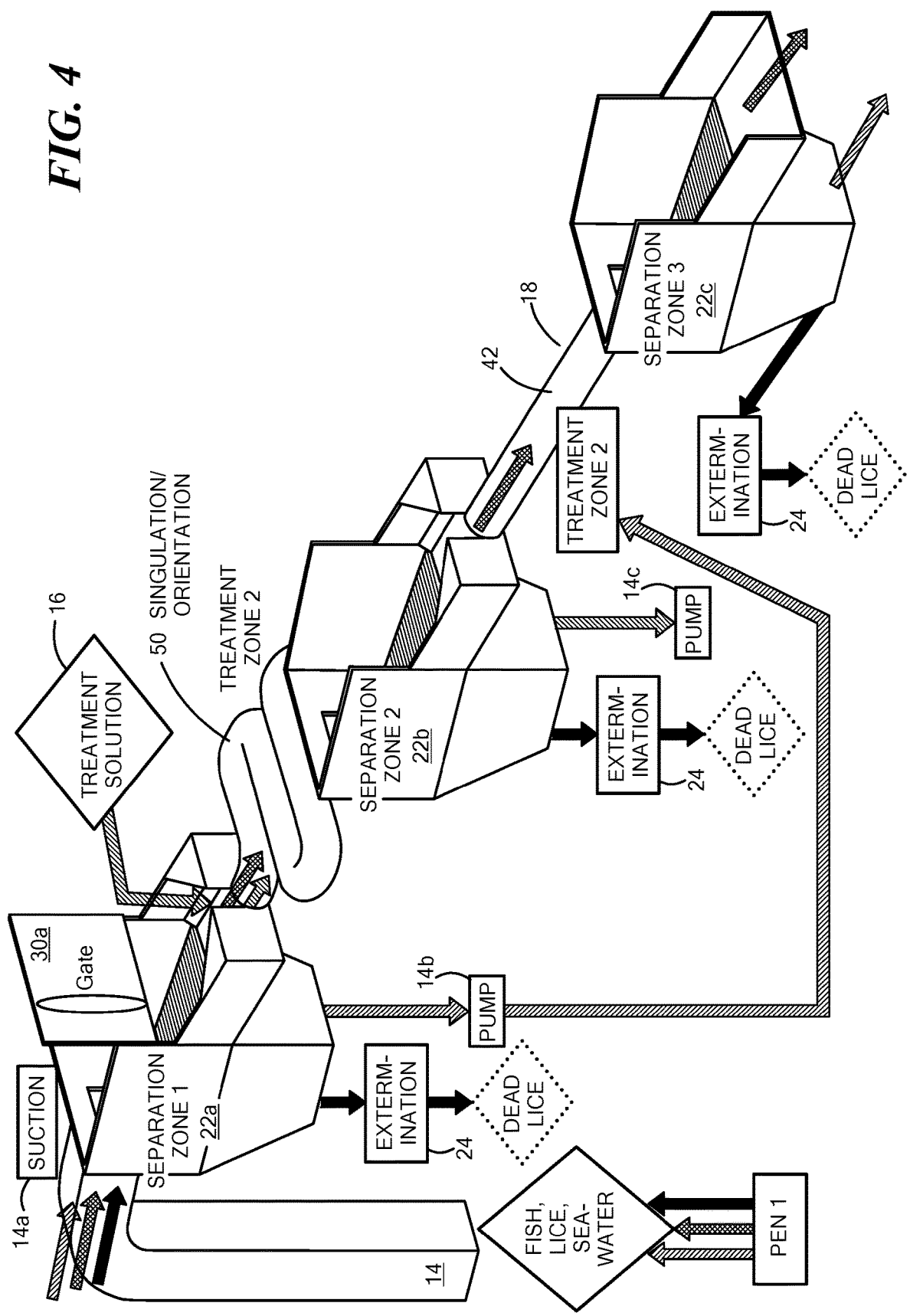
FIG. 4 is a schematic view showing an example of a system in accordance with the block diagram of FIG. 3.

A continuous flow system is shown in FIG. 3. Continuous flow may be beneficial as the fish may be treated faster enabling a higher throughput through the system. Continuous flow may also have the advantage of exposing each fish more precisely to the treatment desired for the precise amount of time. Here, in treatment zone 12, the fish are treated while they are singulated or at least in smaller groups and moving in water. FIG. 4 also shows an example where treatment zone 12 is a continuous flow process as opposed to a batch process. Still, the fish spend a predetermined time in treatment zone 12 via, for example, a serpentine conduit 50. Alternatively, a motorized Archimedes screw 60, FIG. 5, inside conduit 62 may be used. In another version shown in FIG. 6, coiled conduit 64 is fixed to motorized shaft 66 for treating fish 67 for a predetermined dwell time in the first treatment zone 12. In still another version, the pocket feeder mechanism of U.S. 2005/0158430, incorporated by reference herein, may be used. Thus, the fish may be moved along in water through first treatment zone while being treated using one or more of the mechanisms described above (or a similar mechanism).

Figure 5:
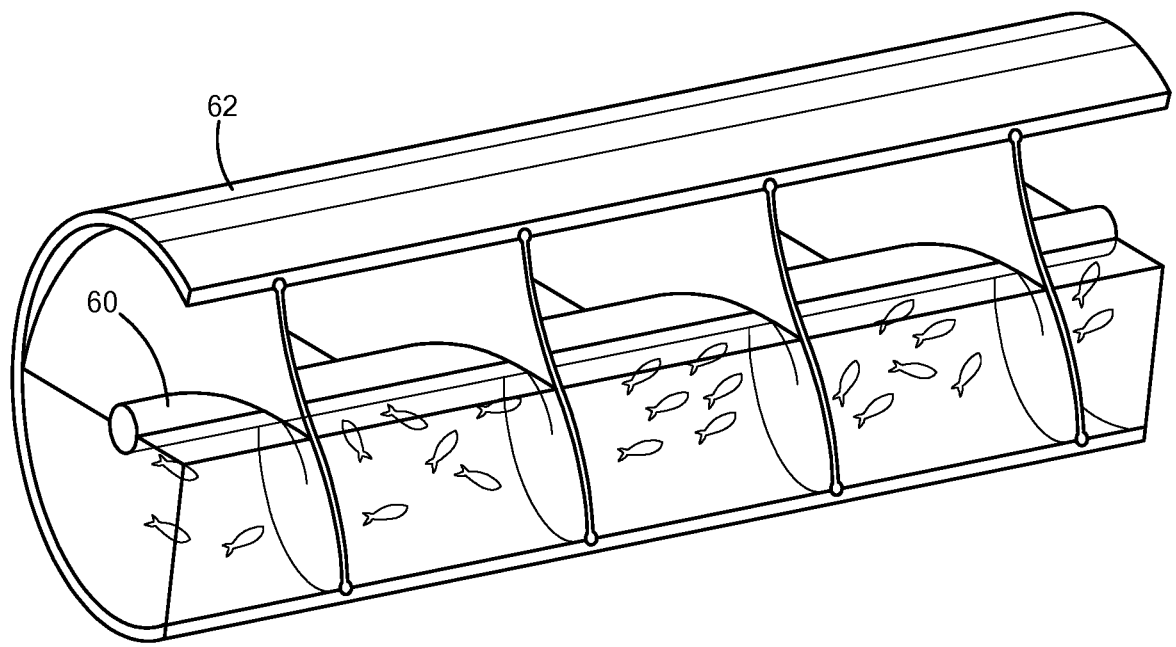
FIG. 5 is a schematic view showing an example of a mechanism for treating fish in the first treatment zone.
Figure 6:
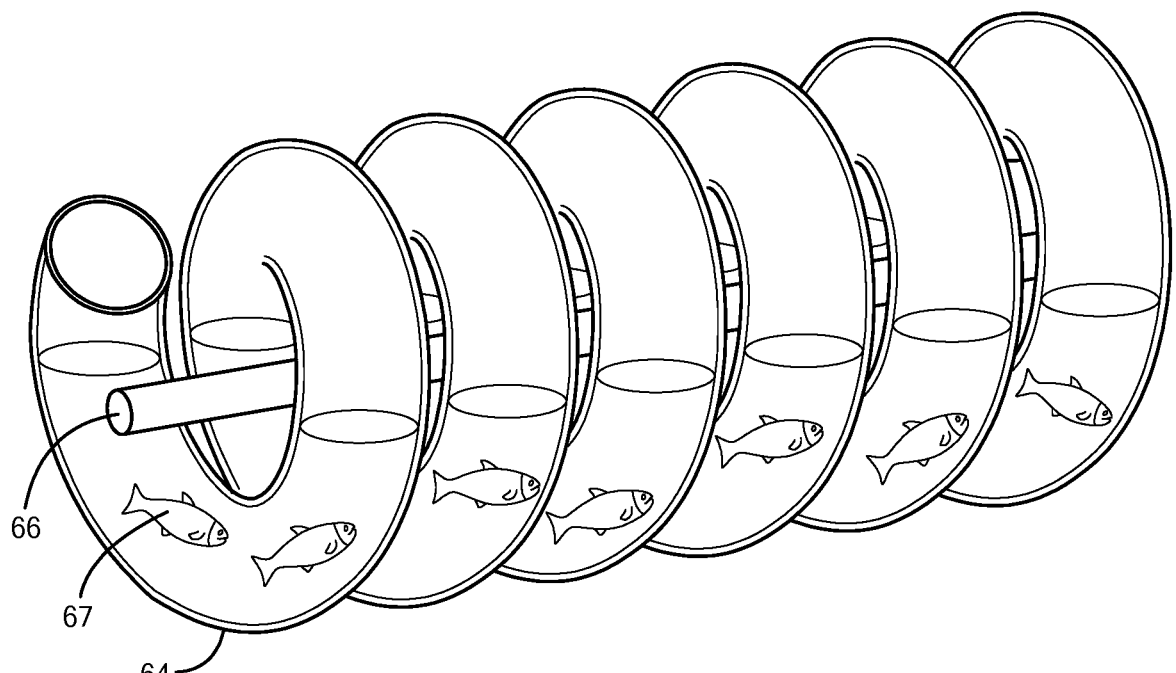
FIG. 6 is a schematic view showing another mechanism for treating fish in the first treatment zone.

Also, whenever the fish must be transported from one location to another in the overall system, the subsystems shown in FIGS. 4-6 or the pocket feeder mechanism of U.S. 200/0158430 may be used. Other subsystems may be used as well.

Figure 7:
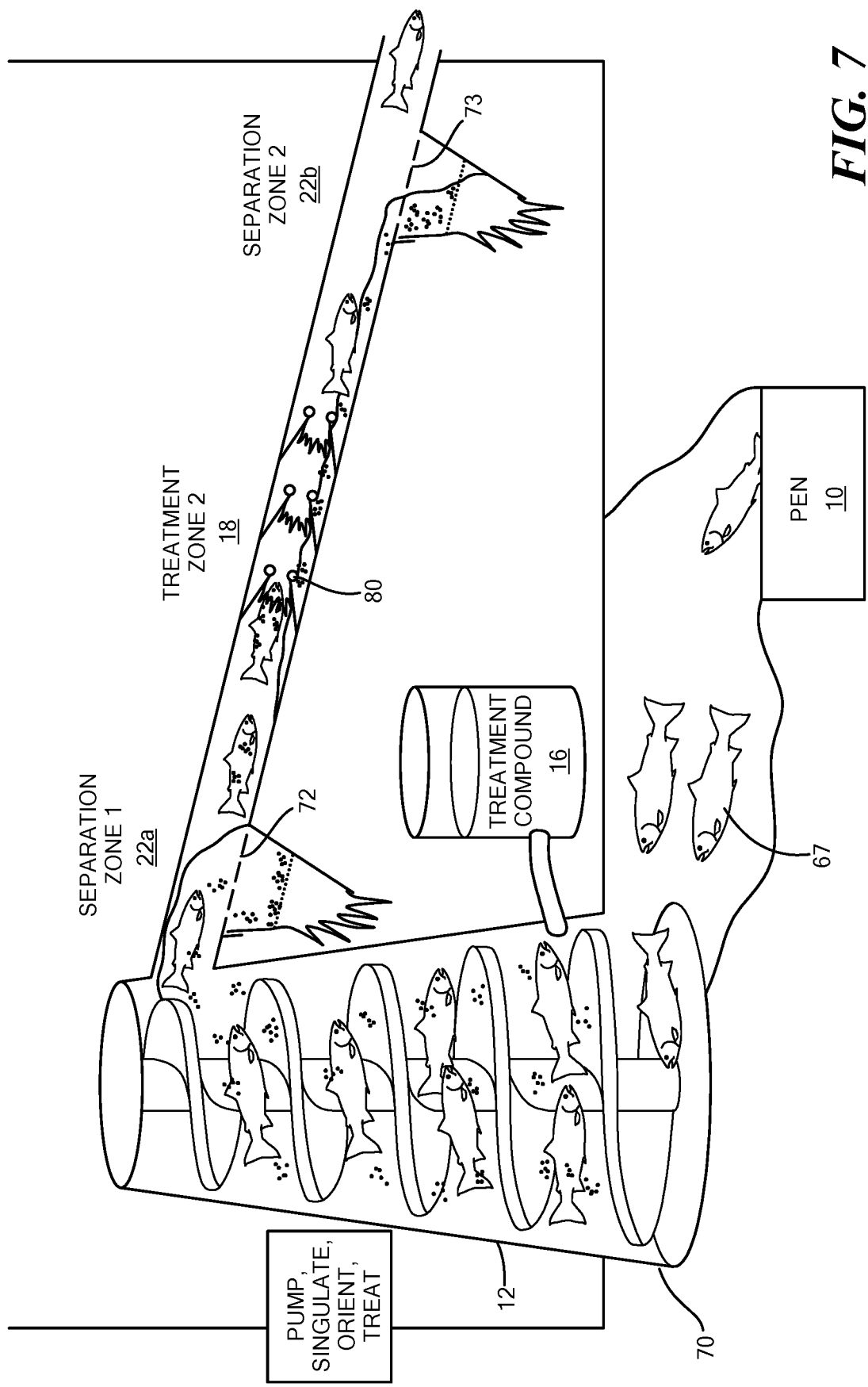
FIG. 7 is a schematic view showing another example of first and second treatment zones.

FIG. 7 shows an example of a system where a motorized vertical conveyor 70 is used to bring fish 67 in sea water up to separation zone 22a where the sea water is removed from the system at separation zone 22 through filter 72. Lice in the sea water may be further filtered out, killed, and collected as noted above.

Optionally, a treatment substance as shown at 16 is introduced into the sea water in vertical conveyor 70 to treat the fish and kill or at least weaken the sea lice or other parasites as the fish move upwards in the conveyor. The pH of the sea water may be raised or lowered, a chemical or biological agent may be used, the water may be warmed or cooled, and/or an osmotic treatment may be used. Other treatments may be used as well. Thus, in this example, the device which moves the fish into the system is also the first treatment zone.

Then, the fish, now in air, travel in downwardly inclined conduit 42 and are subject to mechanical treatment in treatment zone 18. Preferably, the treatment zone 18 constitutes a continuous treatment subsystem. In one preferred embodiment, a series of circumferentially oriented spray heads 80 are used. For example, there may three sets of spray heads with four or eight spray heads in each set. If four spray heads are used, they may be oriented 90° apart and if eight spray heads are used they may be oriented 45° apart. The spray heads function to dislodge the parasites from the fish. In separation zone 22b, there is a grate or filter as shown at 73 for removing from conduit 42 any fluid ejected by the spray heads. Again, any sea lice (and/or eggs) in this fluid may be filtered out, collected, and/or destroyed. The conduit may be inclined to provide the optimal velocity and efficacy e.g., between 5 and 90° with respect to horizontal. Killing the eggs in the system can prevent lice from these eggs from returning which could create further problems.

Featured in some embodiments are spray heads which are urged close to the fish 67 no matter their size. Also, the spray heads may be configured to always spray a fluid, (e.g., water or gas) at a constant angle relative to the fish outer surface. A treatment substance may also be added to the fluid supplied to the spray heads.

In systems with fixed spray heads, small fish may not receive enough of a pressurized spray to dislodge sea lice and a large fish may receive a pressurized spray at too high a pressure and/or velocity, and/or momentum which damages the fish scales, eyes, fins, or the like. This problem is addressed in the subject invention.

Also, any given fish body is small in diameter at the head, then larger in the middle, and them smaller again at the tail. Fixed in place spray heads do not account for this change in fish geometry. This problem too is addressed in the subject invention as discussed below. Finally, prior systems sprayed fluid towards the fish while the fish were in water. The water generally diminishes the effectiveness of the fluid jet spray by diminishing the jet velocity and/or impact pressure, and/or momentum. This problem too is addressed in the subject invention since the fish preferably travel in conduit 42 in air or other medium. In prior systems, if the fish in water passed too close to a given fixed jet spray head then the fish could be harmed including any damage to the eyes or other sensitive areas.

Figure 8A:
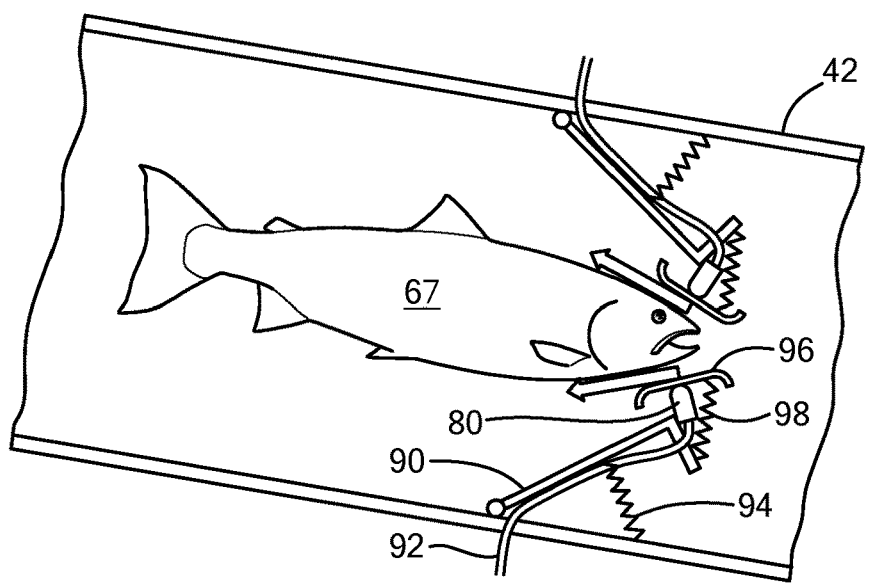
FIGS. 8A-8C are schematic views showing examples of spray heads mounted on pivoting arms in the second treatment zone keeping the spray head nozzles at a constant or near constant close distance and/or at a near constant, predefined angles with respect to the surface of the fish as it proceeds through the second treatment zone.
Figure 9:
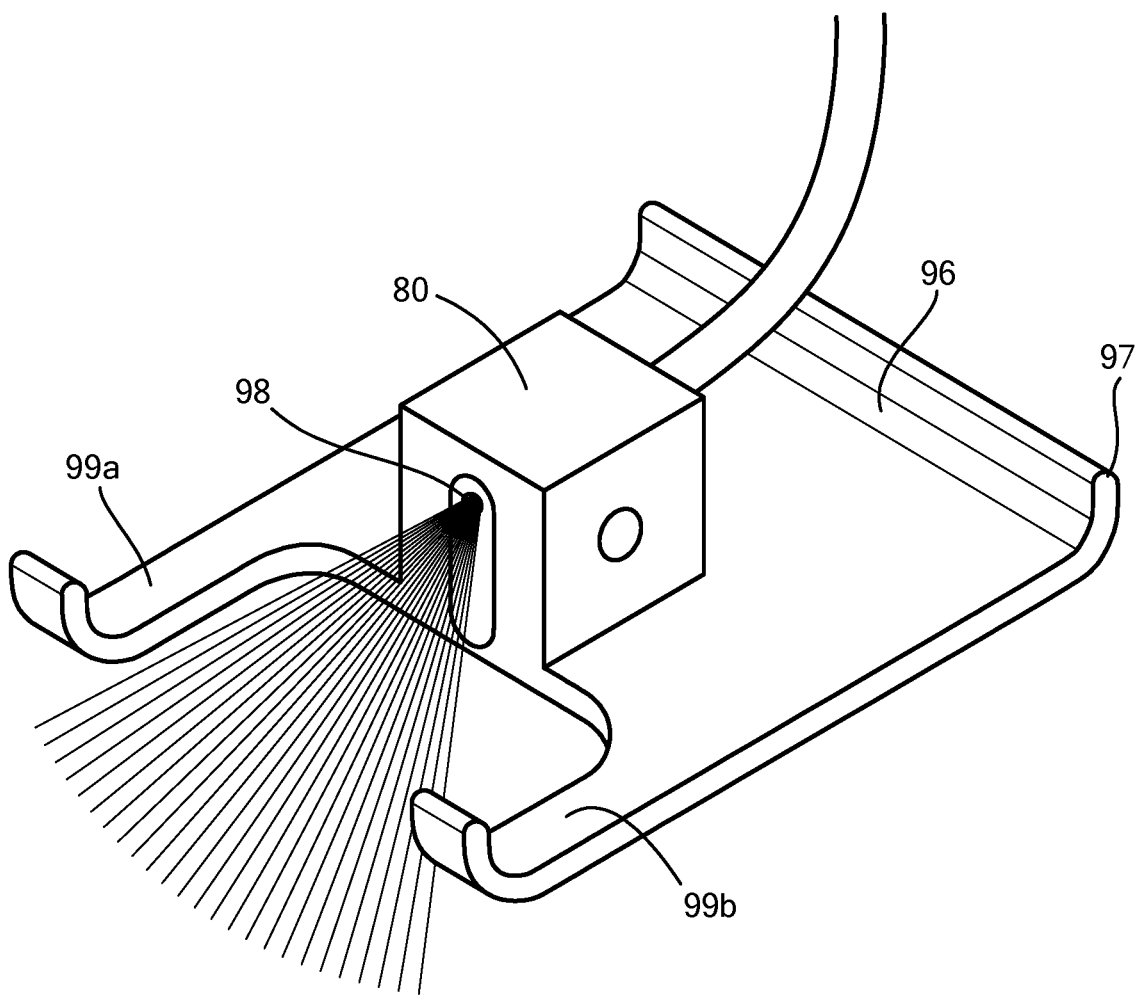
FIG. 9 is a schematic view showing an example of a spray head extending from a shoe member.

FIG. 8A shows an example where spray head 80 is mounted to the distal end of arm member 90 pivotably attached inside downwardly inclined conduit 42. Fluid is supplied to spray head 80 via hose 92. Arm 90 is biased away from conduit 42 via compression spring 94. Spray head 80 may be further fitted with a shoe 96 which may pivot relative to arm 90 and which is biased via a spring 98 to an orientation parallel with the longitudinal axis of the conduit. As shown in FIG. 9, spray head 80 may rise above an orifice in shoe 96 and includes a nozzle 98. A grommet may surround spray head 80 and is fitted to shoe 96. The nozzle 98 may be configured for delivering a fan spray of fluid. The fan spay could be curved in shape conforming to the fish body. In some embodiments, the nozzle and/or the spray head may pivot with respect to the arm it is mounted to. The spray head may then oscillate (e.g., between angles of 0 to 90° or less).

In FIG. 8A, the spray from a nozzle (see nozzle 98, FIG. 9) is shown to be tangential to the surface of the fish. In other embodiments, the spray may be at an angle relative to this tangent (e.g., 0-90°). The nozzle may also deliver a spray angled appropriately to clean underneath and/or behind fins, gills, and the like. The lateral orientation of the nozzles may be +/−90° along the front to back of the fish.

Figure 8B:
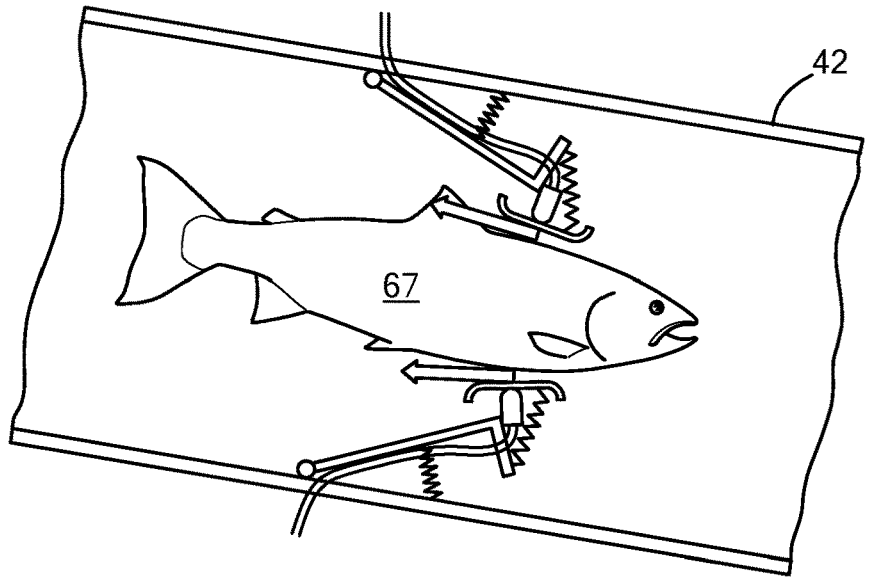
Figure 8C:
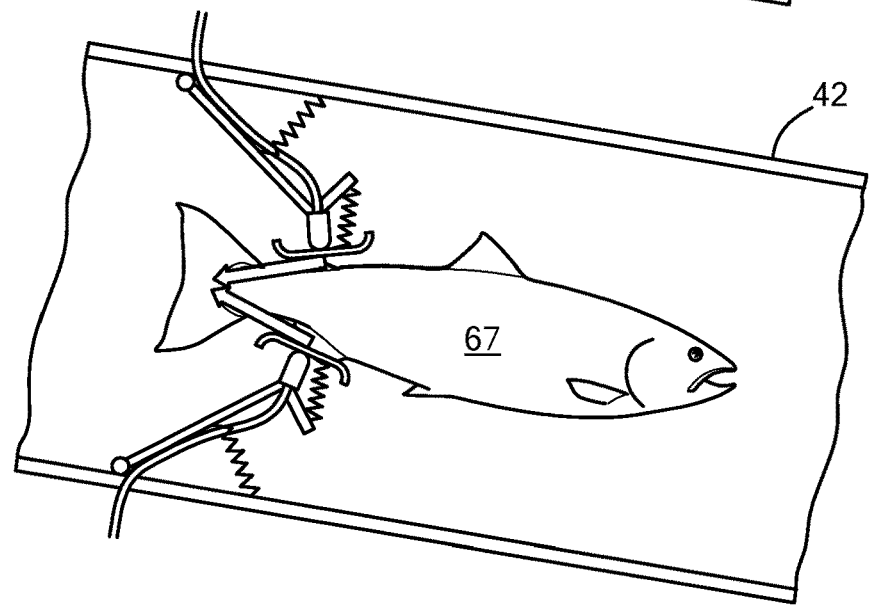

Shoe 96 may be made of or include a slippery top surface (e.g., Delrin or Teflon or similar type material) so as not to harm the fish. The shoe may also function to scrape parasites off the fish body. As shown in FIGS. 8A-8C the arms pivot so at all times the spray head is kept very close to the fish body no matter its size and, for a given fish, close to its small head, larger body, and smaller tail as the fish passes through the system. The spray head nozzle, in all cases, is also kept aligned to spray fluid at a selected optimized angle between 0 and 90 degrees rearward along the fish body to more effectively dislodge parasites and eggs from the fish while not harming scales, gills, and fins.

In this way, the jet spray is more effective: the cleaning spray is in air, the spray nozzle is kept a near constant distance from the fish no matter its size or what portion of orientation anywhere along the circumference of the conduit the fish is being treated, and the jet spray remains at a near constant angle relative to the fish body. With the cleaning sprays in air, little energy is lost from the spray as it moves through air to the lice and fish surface. Alternatively, if the fish and spray jets are in water, as long as the spray nozzle is kept a near constant distance from the fish and a near constant angle relative to the fish body, the spray pressure may be adjusted to remain effective.

Figure 10A:
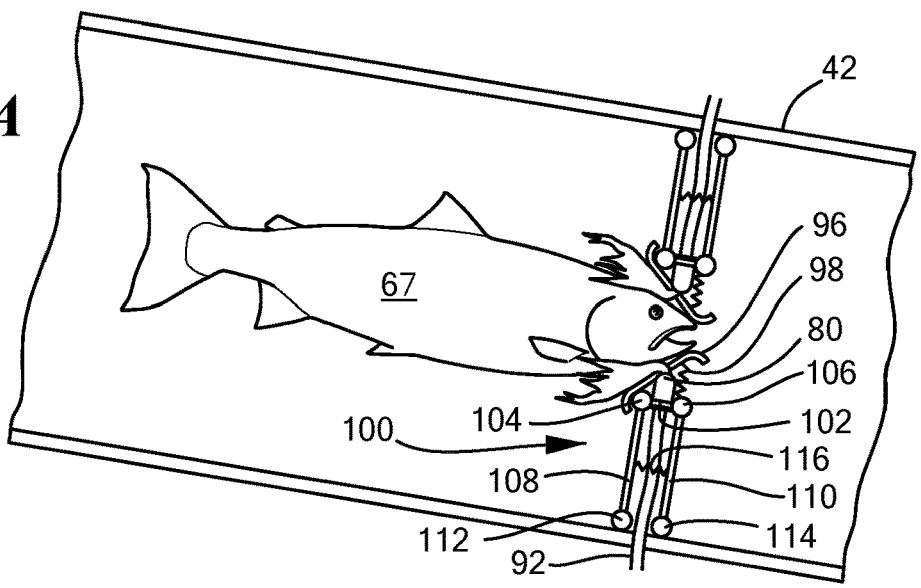
FIGS. 10A-10C are schematic views showing a fish traveling through an example of the second treatment zone where the spray heads are mounted to four bar linkages.
Figure 10B:
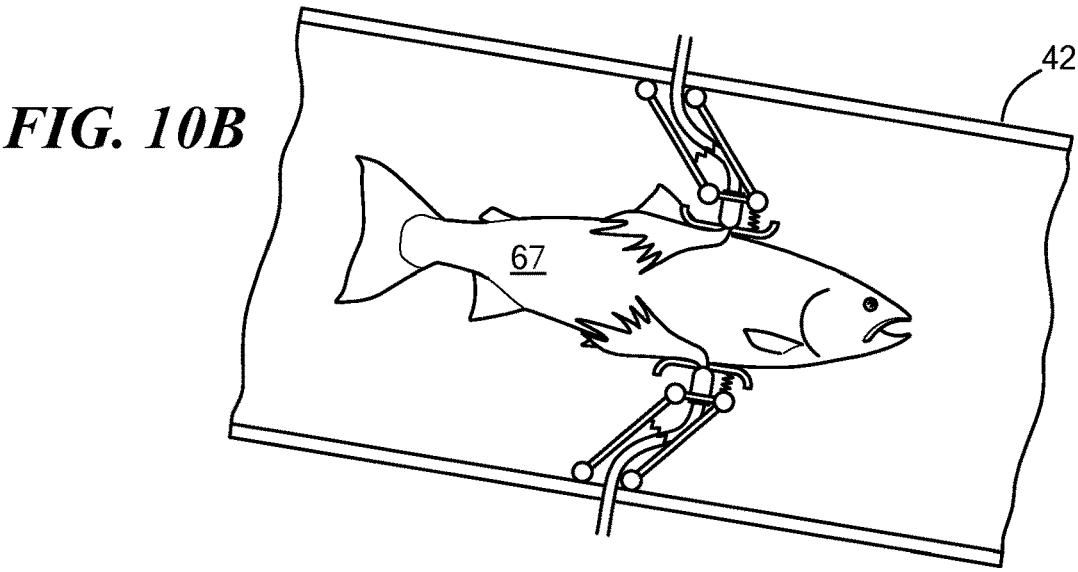
Figure 10C:
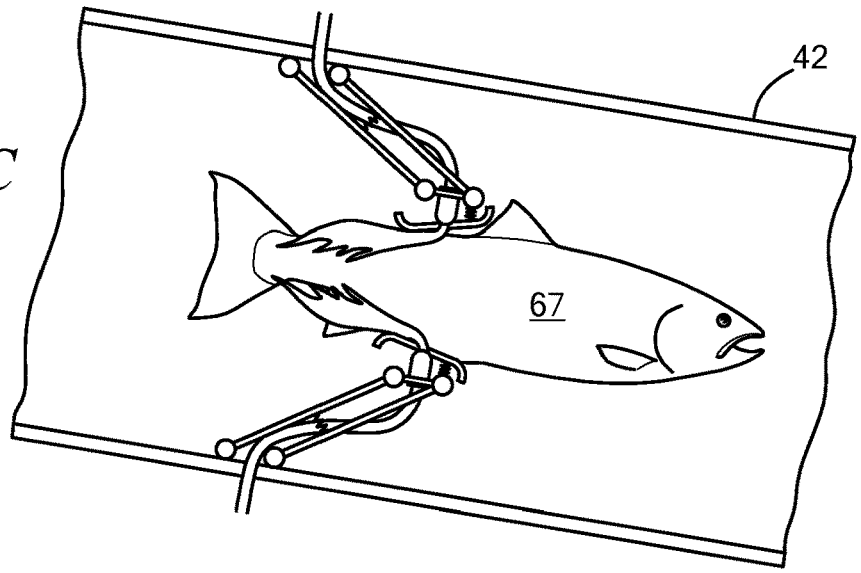

In FIGS. 10A-10C, the spray heads 80 are attached to four bar linkages 100. Preferably, the spray heads are attached to top bar 102 thereof. Top bar 102 is then attached via pivots 104 and 106 to bars 108 and 110 which are pivotably attached via pivots 112 and 114 to the conduit 42 wall (the fourth "bar").

By using a four bar or other linkage, the spray head nozzle is kept at a constant distance from the fish body and at a constant angle relative to the longitudinal axis of the conduit. The linkage keeps the spray head at a constant angle with respect to the pipe wall as the linkage and the spray head follows the outer surface of the fish moving by. With pivoting shoes on the outer bar, the head will follow the fish surface and keep the jet spray angle constant with respect to the fish surface while bar 102 stays parallel to the pipe wall. Compression spring 116 between arms 108 and 110 may be used to bias the four bar linkage away from the conduit (e.g., at a 90° angle relative to the longitudinal axis of the conduit wall).

In some examples, opposing spray heads may be 1-2 inches apart from each other (when the arm is 90° to the conduit), the spray heads may be disposed a near constant distance of 1-2 inches from the fish body, may provide a fluid spray at a pressure, for example, of 25-200 PSI and at a flow rate, for example, of 0.5-1 GPM to effectively remove parasites. Fan shaped sprays or other shapes may be used to optimize treatment coverage on the surface of the fish regardless of the shape and size of the fish. Different sets of nozzles may be in stages of the process to give maximum efficiency. The fan nozzles may overlap as needed for the biggest fish (bigger circle) and thus the longest circumference and distance between the nozzles. In one example, the final cleaning of the fish to remove salmon lice and eggs may be done by "curtain" nozzles. Flat shaped jets or jets that are made out of a slit in the circumference of the tube that face inwardly may be used, to make the pressure variation less dependent on the distance from the head of the jet.

Figure 11:
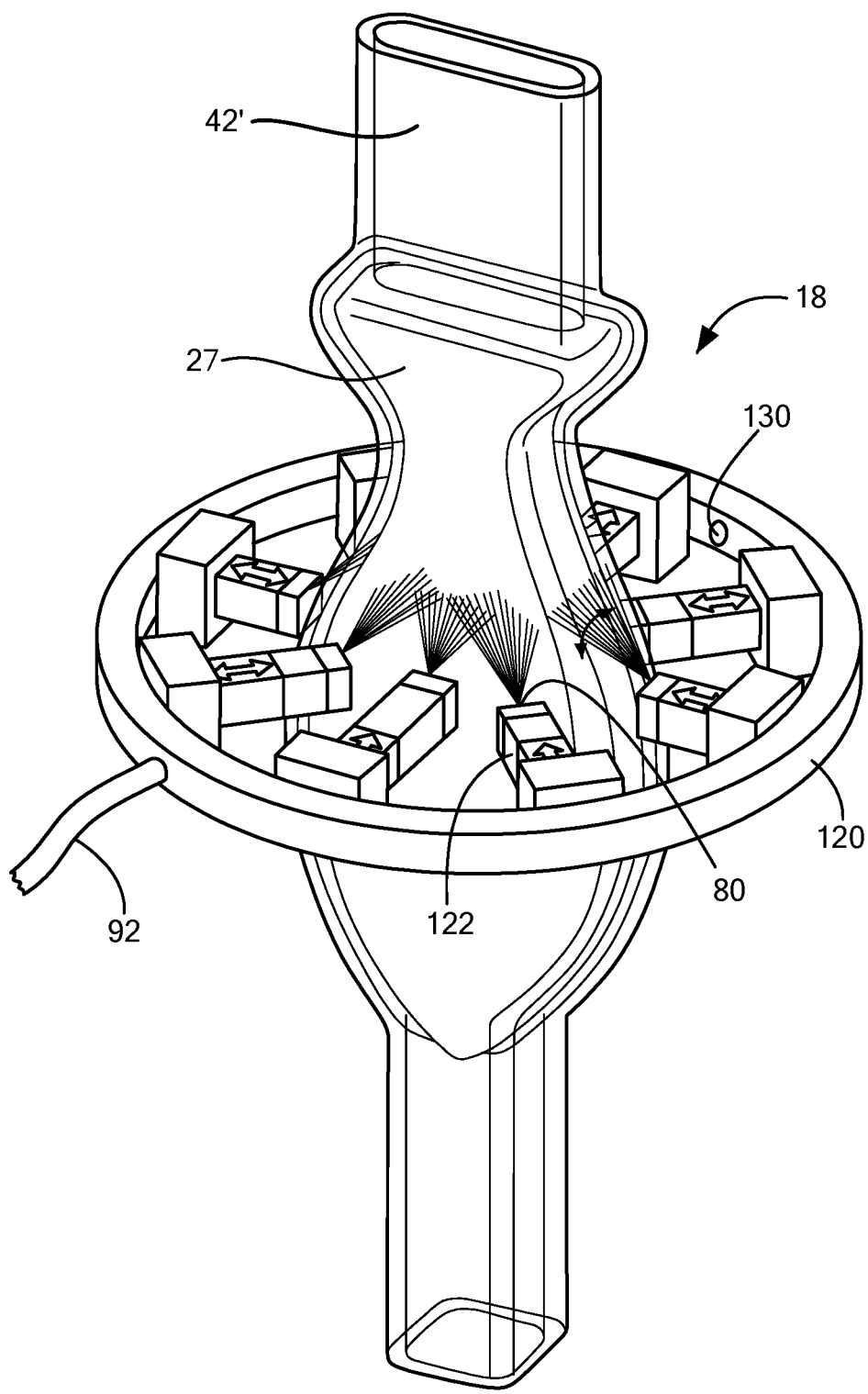
FIG. 11 is a schematic view showing fish directed through a radially expandable chute and spray heads arranged on extendible and retractable pistons mounted to a ring disposed about the expandable chute.

There are other means for adjusting the arms depending on the size of the fish and the conduit and for closely spacing the spray head nozzles with respect to the fish. For example, FIG. 11 shows singulated and oriented fish in a vertical or angled conduit which here is in the form of a flexible conforming transversely or circumferentially or radially expandable chute 42' (e.g., a net, mesh, or the like). See, for example, U.S. Pat. No. 4,705,141, incorporated by reference herein.

The material of the chute may assist in scraping sea lice or other organisms off the surface of the fish in the second treatment zone 18. The material of the chute, however, should be configured to allow the water jet to reach the surface of the fish body. In this example, there is a ring 120 disposed about the chute and the spray heads 80 (in this example 8 spray heads) are mounted on piston arms 122 extending inwardly from the ring 120. Ring 120 may form a distributor for the fluid delivered to it via hose 92 and thus is configured to deliver the fluid to the individual spray heads via their respective arms. This radially expandable chute may also act as a speed controller, so the fish is constantly treated equally over its length passing the nozzles at a controlled speed.

The piston arms may extend and retract based on the size of fish 27 in the chute and the area being treated (e.g., head, body, tail) to keep the spray nozzles of the spray head at a constant or near constant close distance to the surface of fish 27. Preferably, the spray nozzles of the spray heads are oriented to spray rearwardly along the body of fish 27 to effectively remove parasites and to prevent damage to the scales of fish 27. The piston arms may be actuated.

One or more sensors 130 may be used to sense the distance of the body of fish 27 from the ring 120 (or, alternatively, a nozzle). The output of the sensor(s) may be fed to a processor (not shown) which then drives the actuators of the piston arms accordingly to keep the spray heads at a desired distance to the fish body. The sensor subsystem could be based on capacitance, for example, with the exterior of chute 42' including markers which can be sensed by the sensor(s). Other sensor subsystems may be used. In other examples, the nozzles are attached to the material of the chute or sleeve. See FIGS. 12-14.

The ring/piston arrangement shown in FIG. 11 may be used, in addition, in conjunction with conduits 42a, 42b, and 42c, FIG. 2, as well provided there are orifices in the conduits for the spray heads and piston arms. In some examples, the second treatment zone includes only one conduit. In other examples, the second treatment zone includes multiple conduits. The nozzles may be used in multiple stages, multiple angles, and/or orientations. Also sensors may be employed to target single salmon lice or more dense populations to make the process more cost effective. This process could also contribute to counting and/or to verify the quality of the cleaning process in a cost effective way. Also possible is a closed-loop control system with real-time monitoring of key parameters to ensure consistent quality e.g. salinity, temperature, O2, CO2, number of fish processed, and the like, the amount of sea lice removed per period of time and the like. Data could be gathered and analyzed over time to provide optimal treatments amongst the individual treatment centers or groups of treatment centers.

The result in any embodiment is a more effective treatment method and system which is cost-effective and which is ecologically sound.

Figure 15:
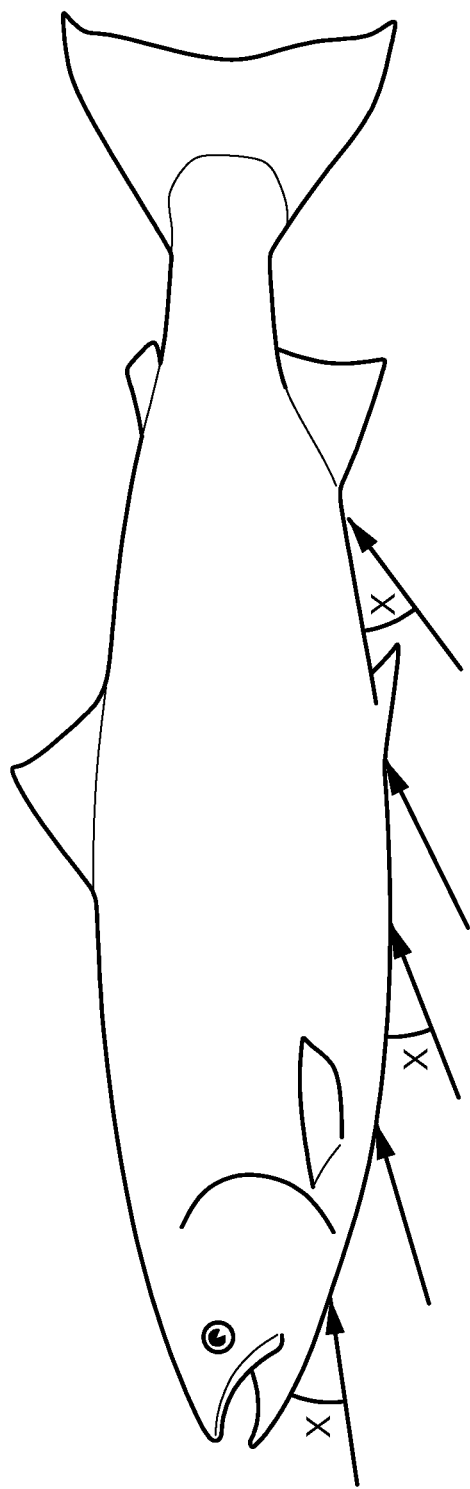
FIG. 15 is a view showing how the spray nozzles maintain a constant jet angle to the surface of the fish and a constant water jet force along the surface of the fish.

FIG. 15 shows how the nozzles are configured to maintain a constant jet angle to the surface of the fish and how the nozzles maintain a constant water jet force along the surface of the fish (e.g., adjusting the nozzles so they are kept at a constant or near constant distance from the fish).

FIG. 16 shows an embodiment where two drive belt assemblies urge fish from a treatment tank to another location. The belts may be mesh like in construction so nozzles spray a fluid from inside one or both belt assemblies.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A system for removing parasites from fish comprising:
   a downwardly angled enclosed conduit through which individual fish freely pass;
   two or more spaced sets of arms extending inward from the enclosed conduit, each set of arms including a plurality of arms circumferentially spaced;
   each arm constitutes a bar linkage pivotably attached to the conduit, each arm further includes:
      a distal shoe for engaging the fish, and
      a spray nozzle directly affixed to a respective shoe, wherein each spray nozzle is connected to a fluid source for dislodging parasites from said fish; and
   means for adjusting the arms relative to the enclosed conduit depending on the size of the fish in the conduit for closely spacing the spray nozzles with respect to the fish without stressing or harming the fish.

2. The system of claim 1 wherein each said distal shoe is pivotably attached to the distal end of each respective arm.

3. The system of claim 1 wherein said arms biased away from the conduit.

4. The system of claim 3 in which the means for adjusting the arms include compression spring associated with each bar linkage biasing it away from the conduit.

5. The system of claim 1 further including a treatment zone upstream of said conduit where fish are pretreated.

6. The system of claim 1 wherein the spray nozzles are rearwardly angled and the fish pass in the conduit in air.

7. The system of claim 1 in which the sets of arms includes four circumferentially spaced arms at 90° apart from each other.

8. The system of claim 1 in which a set of arms includes eight circumferentially spaced arms at 45° apart from each other.

9. A system for removing parasites from fish comprising:
   a downwardly angled enclosed conduit through which individual fish freely pass;
   two or more spaced sets of circumferentially spaced arms associated with the conduit;
   each arm constitutes a bar linkage pivotably attached to the conduit, each arm further includes:
   a distal shoe for engaging the fish, and
   a distally disposed spray head with a nozzle affixed directly to a respective shoe for spraying a fluid at fish traveling through the conduit for dislodging parasites from said fish; and
   the arms automatically adjusting relative to the conduit depending on the size of the fish in the conduit for closely spacing the spray nozzles with respect to the fish.

10. The system of claim 9 wherein the arms adjust by pivoting in relation to the surface of the fish.

11. The system of claim 9 wherein the arms adjust by retracting and extending in proximity to the fish.

* * * * *